United States Patent [19]
Johnson et al.

[11] Patent Number: 5,483,053
[45] Date of Patent: Jan. 9, 1996

[54] VARIABLE RESOLUTION COLOR IMAGE SCANNER HAVING AN EXPOSURE DELAY BETWEEN SUCCESSIVE LINEAR PHOTOSENSORS DETECTING DIFFERENT COLORS

[75] Inventors: Dan S. Johnson, Greeley; Wayne G. Phillips, Loveland, both of Colo.

[73] Assignee: Hewlett-Packard Company, Palo Alto, Calif.

[21] Appl. No.: 312,594

[22] Filed: Sep. 27, 1994

[51] Int. Cl.⁶ .................................................... G01J 3/50
[52] U.S. Cl. ....................... 250/226; 250/208.1; 250/234; 358/514
[58] Field of Search ............................... 250/226, 208.1, 250/234; 358/514; 348/263, 265

[56] References Cited

U.S. PATENT DOCUMENTS

| | | | |
|---|---|---|---|
| 4,663,535 | 5/1987 | Nakai et al. | 250/226 |
| 4,709,144 | 11/1987 | Vincent | 250/226 |
| 4,809,061 | 2/1989 | Suzuki | 358/514 |
| 4,891,690 | 1/1990 | Hasegawa et al. | 358/514 |
| 4,926,041 | 5/1990 | Boyd et al. | 250/226 |
| 5,047,871 | 9/1991 | Meyer et al. | 358/486 |
| 5,227,620 | 7/1993 | Elder, Jr. et al. | 250/208.1 |
| 5,336,878 | 8/1994 | Boyd et al. | 250/208.1 |
| 5,365,352 | 11/1994 | Tajima | 358/514 |
| 5,406,066 | 4/1995 | Steinle et al. | 250/226 |

OTHER PUBLICATIONS

Takeuchi, R. et al. (1986) "Color Image Scanner with an RGB Linear Image Sensor," SPSE Conference, the Third International Congress on Advances in Non–Impact Printing Technologies, pp. 339–346, Aug. 1986.

Primary Examiner—Edward P. Westin
Assistant Examiner—Steven L. Nichols

[57] ABSTRACT

A method of scanning an object at a predetermined resolution along the scanning direction with color scanner apparatus having M linear photosensors positioned in parallel, spaced-apart relation and being exposed for a predetermined exposure time, may comprise the steps of calculating an exposure delay time for each of (M-1) slave linear photosensors. Then, at a start scan time, a master linear photosensor is exposed to light from the illuminated scan line for the predetermined exposure time. However, the slave linear photosensors are not necessarily exposed at the start scan time. Instead, the first exposure for each of the slave linear photosensors is delayed for a time equivalent to the exposure delay time calculated for each respective slave linear photosensor.

10 Claims, 7 Drawing Sheets

VARIABLE RESOLUTION COLOR IMAGE SCANNER HAVING AN EXPOSURE DELAY BETWEEN SUCCESSIVE LINEAR PHOTOSENSORS DETECTING DIFFERENT COLORS

BACKGROUND

The present invention relates to color optical scanners in general and more specifically to variable resolution, single pass color optical scanners.

Color optical scanners are similar to black and white optical scanners in that data signals representative of the object or document being scanned are produced by projecting an image of the document onto an optical photosensor array. The data signals may then be digitized and stored for later use. For example, the data signals may be used by a personal computer to produce an image of the scanned object on a suitable display device.

Most optical scanners use illumination and optical systems to illuminate the object and focus a small area of the illuminated object, usually referred to as a "scan line," onto the optical photosensor array. The entire object is then scanned by sweeping the illuminated scan line across the entire object, either by moving the object with respect to the illumination and optical assemblies or by moving the illumination and optical assemblies relative to the object.

A typical scanner optical system will include a lens assembly to focus the image of the illuminated scan line onto the surface of the optical photosensor array. Depending on the particular design, the scanner optical system may also include a plurality of mirrors to "fold" the path of the light beam, thus allowing the optical system to be conveniently mounted within a relatively small enclosure. In order to allow a smaller photosensor array to be used, most optical systems also reduce the size of the image of the scan line that is focused onto the surface of the photosensor. For example, many optical systems have a lens reduction ratio of about 8:1, which reduces the size of the image of the scan line by a factor of about 8.

While various types of photosensor devices may be used in optical scanners, the most common sensor is the charge coupled device or CCD. As is well-known, a CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as sampling intervals, which may be about 5 milliseconds for a typical scanner.

In most optical scanner applications, each of the individual pixels in the CCD are arranged end-to-end, thus forming a linear array. Each pixel in the CCD array thus corresponds to a related pixel portion of the illuminated scan line. The individual pixels in the linear photosensor array are generally aligned in the "cross" direction, i.e., perpendicular to the direction of movement of the illuminated scan line across the object (also known as the "scan direction"). Each pixel of the linear photosensor array thus has a length measured in the cross direction and a width measured in the scan direction. In most CCD arrays the length and width of the pixels are equal, typically being about 8 microns or so in each dimension.

As mentioned above, each pixel in the CCD array corresponds to a related pixel portion of the illuminated scan line on the object. To avoid confusion, the corresponding pixel portion on the illuminated scan line will be referred to herein as a "native object pixel" or simply "native pixel." A native object pixel has dimensions equal to the dimensions of the corresponding pixel on the linear photosensor array multiplied by the lens reduction ratio of the optical system. For example, in a scanner having a CCD pixel size of 8 microns by 8 microns and a lens reduction ratio of 8:1, the size of the native object pixels will be about 64 microns by 64 microns. Also, the linear array of native object pixels that corresponds to the linear array of CCD pixels will be referred to herein as a "native scan line."

Scanners are typically operated at a scan line sweep rate such that one native object pixel width (i.e., a native scan line) is traversed during each CCD sampling interval. However it has been discovered, as disclosed in Meyer et al., U.S. Pat. No. 5,047,871, which is hereby specifically incorporated by reference for all that it discloses, that the resolution of a display image produced with data generated by some scanners may be varied by changing the scan line sweep rate of the scanner. For example, by increasing the scan line sweep rate from one native scan line per sampling interval to two native scan lines per sampling interval, each CCD is exposed to two native scan line widths during a single sampling interval. As a result, the size (as measured along the scan direction) of the image resulting from the faster scan speed is one-half the size of a display image produced at the slower scan speed. Put in other words, the increased scan speed results in an effective increase in the width of object pixels, which also corresponds to a decrease in resolution along the scan direction. The ability to vary the resolution along the scan direction and/or "scale" the image produced by a display device by controlling scanner sweep speed is a significant feature which is offered on some newer scanners.

Color optical scanners differ from the black and white scanners described above in that multiple color component images of an object must be collected to produce a color display image of the object. For example, data representative of red, green, and blue color components of the image of the scan line may be produced, correlated, and stored by the scanner apparatus.

Many different techniques have been developed for collecting data representative of multiple color component images of the object being scanned. One technique projects the image of the illuminated scan line onto a single linear sensor array in much the same way as for black and white scanners. However, in order to collect the multiple color component images of the illuminated scan line, a different color light source is used to illuminate the scan line on each of many scanning passes. For example, the object first may be scanned using only red light, then only green light, and finally only blue light. In a variation of this technique, three scanning passes are made using a white light source, but the light from the illuminated scan line is filtered by a different color filter during each of the three passes before being focused onto the optical photosensor array.

Another technique, described in U.S. Pat. No. 4,709,144 issued to Vincent and U.S. Pat. No. 4,926,041, issued to Boyd, et al., both of which are hereby specifically incorporated by reference for all that is disclosed therein, is to split the illuminated (i.e., polychromatic) scan line into multiple color component beams, each of which are then focused onto multiple linear photosensor arrays. For example, the illuminated scan line may be split into red, green, and blue color component portions which are then simultaneously projected onto three (3) separate linear photosensor arrays. This technique allows the component color image data generated from any particular scan line to be generated simultaneously, thus allowing easier correlation of the image data for each separate color component.

Yet another technique for generating multiple color component images from a polychromatic or white light source is described by Takeuchi, R. et al. (1986), in "Color Image Scanner with an RGB Linear Image Sensor," SPSE Conference, The Third International Congress On Advances in Non-Impact Printing Technologies, PP339-346, August 1986, which is hereby specifically incorporated by reference for all that it discloses. Essentially, Takeuchi simultaneously projects light from different scan line regions of the object onto separate linear photosensor arrays, each of which is covered with a different color filter. With this technique it is necessary to first correlate the data representative of different scan line component images since the different component color images of any scan line region of the document are generated at different times.

Regardless of the particular technique used to collect data representative of multiple component color images, there remains the problem of correlating the data for the various color component images so that they correspond to the same illuminated scan line on the object. One solution to the problem is to allow the scanner to scan only at those scan rates, known as "native scan rates," that allow the color image data to be easily correlated by the image processing system. Unfortunately, there are a limited number of native scan rates that will allow for such simple color data correlation. Since the resolution of the scanner is related to the scanning rate, a scanner limited to scanning at a few native scan rates will be limited to a corresponding few scan resolutions, known as "native scan resolutions," thus significantly reducing the utility of the scanner.

One method that will allow for scanning at resolutions other than native scan resolutions is to select the next higher native scan resolution that will allow for simple color data correlation, and then drop data from selected pixels, or otherwise process the data to achieve the desired resolution. Unfortunately, this method can result in decreased image quality unless relatively intensive data processing operations are performed to enhance the image data.

Still another method that will allow for scanning at various predetermined resolutions is disclosed in U.S. Pat. No. 5,336,878 issued to Boyd, et al., which is specifically incorporated herein by reference for all that it discloses. While the method and apparatus disclosed in Boyd has many advantages, the color components of the resulting image can still be mis-aligned by up to ½ an effective scan line width.

Consequently, there remains a need for a variable resolution color scanner that can properly correlate the color image data over a wide range of non-native scan resolutions, thus scan rates, but without any remaining color misalignment.

SUMMARY OF THE INVENTION

Color scanner apparatus having improved Y-scaling according to the present invention may comprise a light source for illuminating an object and an imaging device for focusing light from an illuminated scan line on the object onto an image region. A photosensor assembly operable in successive sampling intervals for generating image data representative of a color image of the object may comprise first and second linear photosensors positioned in parallel, spaced-apart relation in the image region. First and second color filters are operatively associated with the first and second linear photosensors so that the first linear photosensor receives only light of a first preselected color and the second photosensor receives only light of a second preselected color. The scanner also includes displacement apparatus for producing relative displacement between the object and the imaging device so that a sweeping scan image of the object will be produced in the image region. An exposure control device connected to the first and second linear photosensors delays the exposure of the second linear photosensor relative to the exposure of the first photosensor.

The method of scanning an object at a predetermined resolution along the scanning direction with color scanner apparatus having M linear photosensors positioned in parallel, spaced-apart relation and being exposed for a predetermined exposure time may comprise the steps of calculating an exposure delay time for each of (M-1) slave linear photosensors. Then, at a start scan time, a master linear photosensor is exposed to light from the illuminated scan line for the predetermined exposure time. However, the slave linear photosensors are not necessarily exposed at the start scan time. Instead, the first exposure for each of the slave linear photosensors is delayed for a time equivalent to the exposure delay time calculated for each respective slave linear photosensor.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
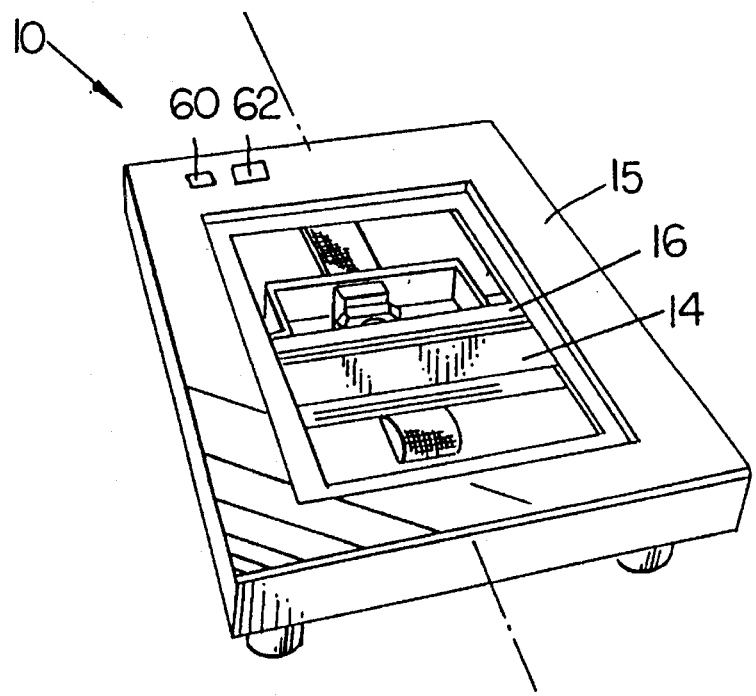
FIG. 1 is a perspective view of an optical scanner device.
Figure 2:
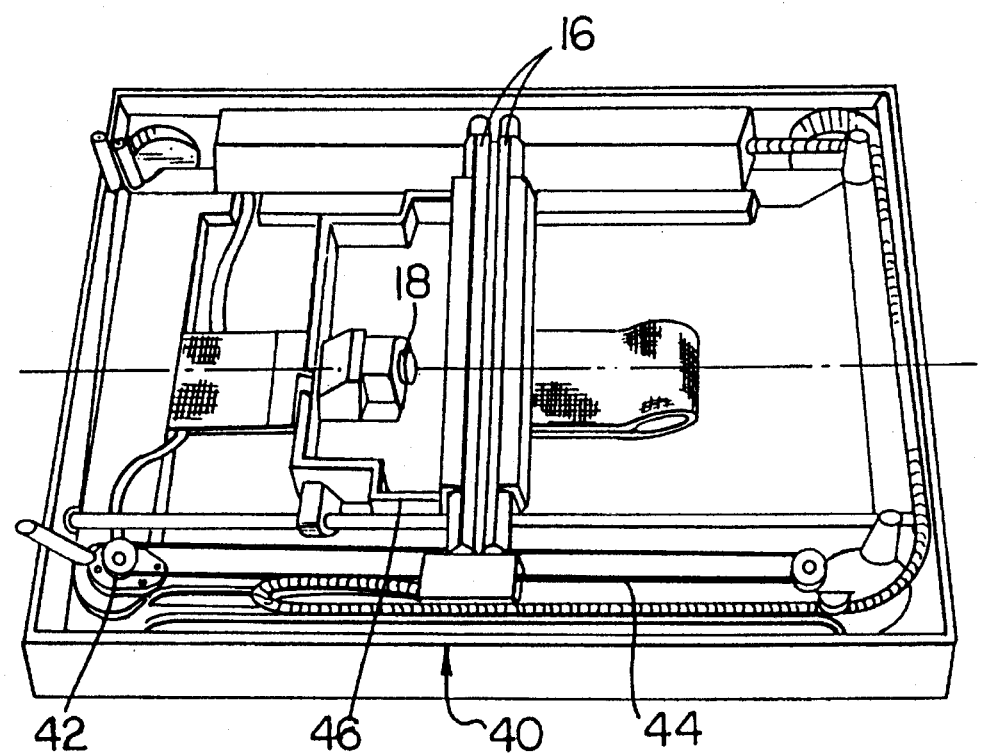
FIG. 2 is a perspective view of the optical scanner device of FIG. 1 with the top panel removed.
Figure 3:
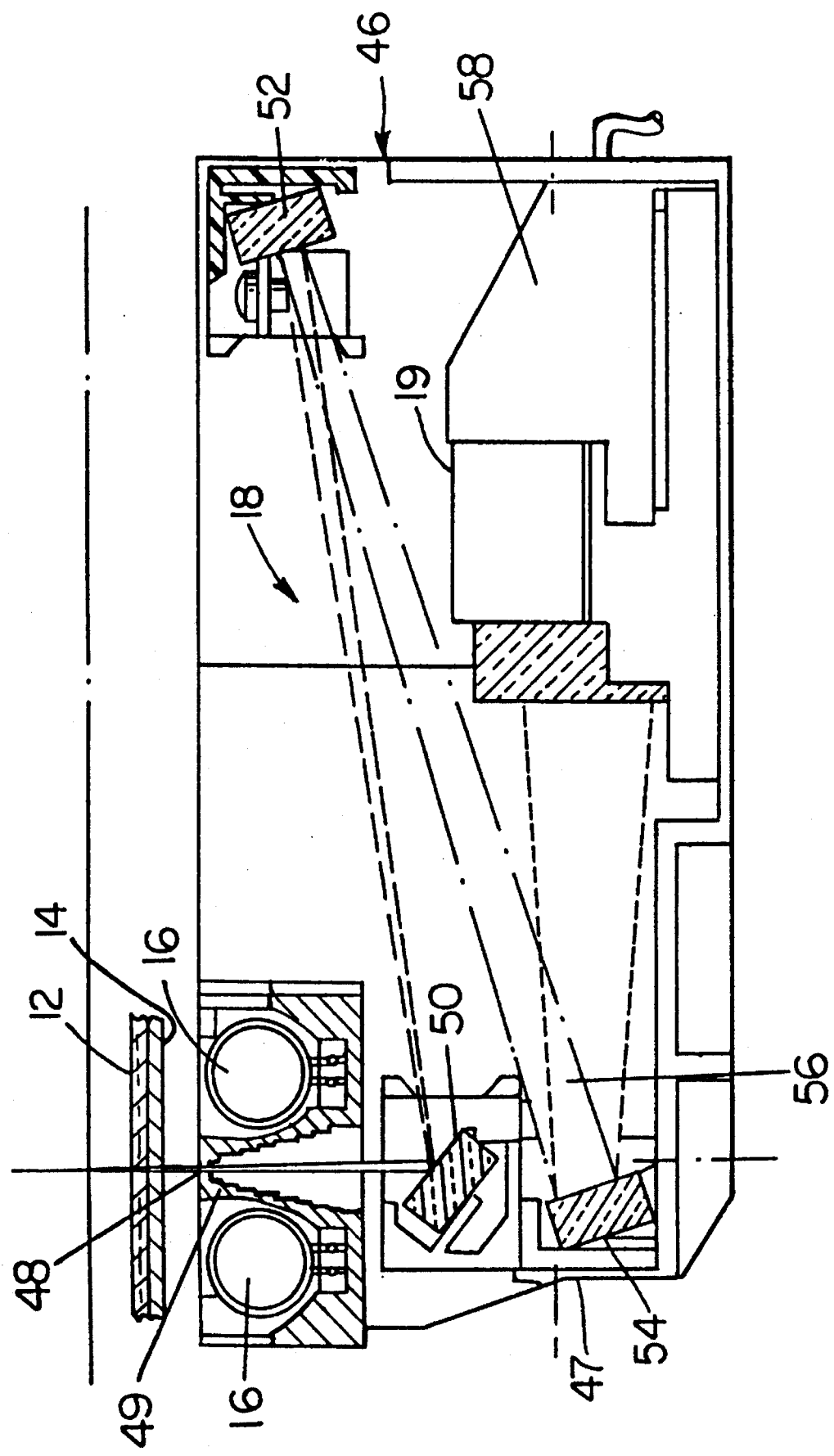
FIG. 3 is a cross-sectional elevation view of a carriage portion of the optical scanner device of Figures 1 and 2.
Figure 4:
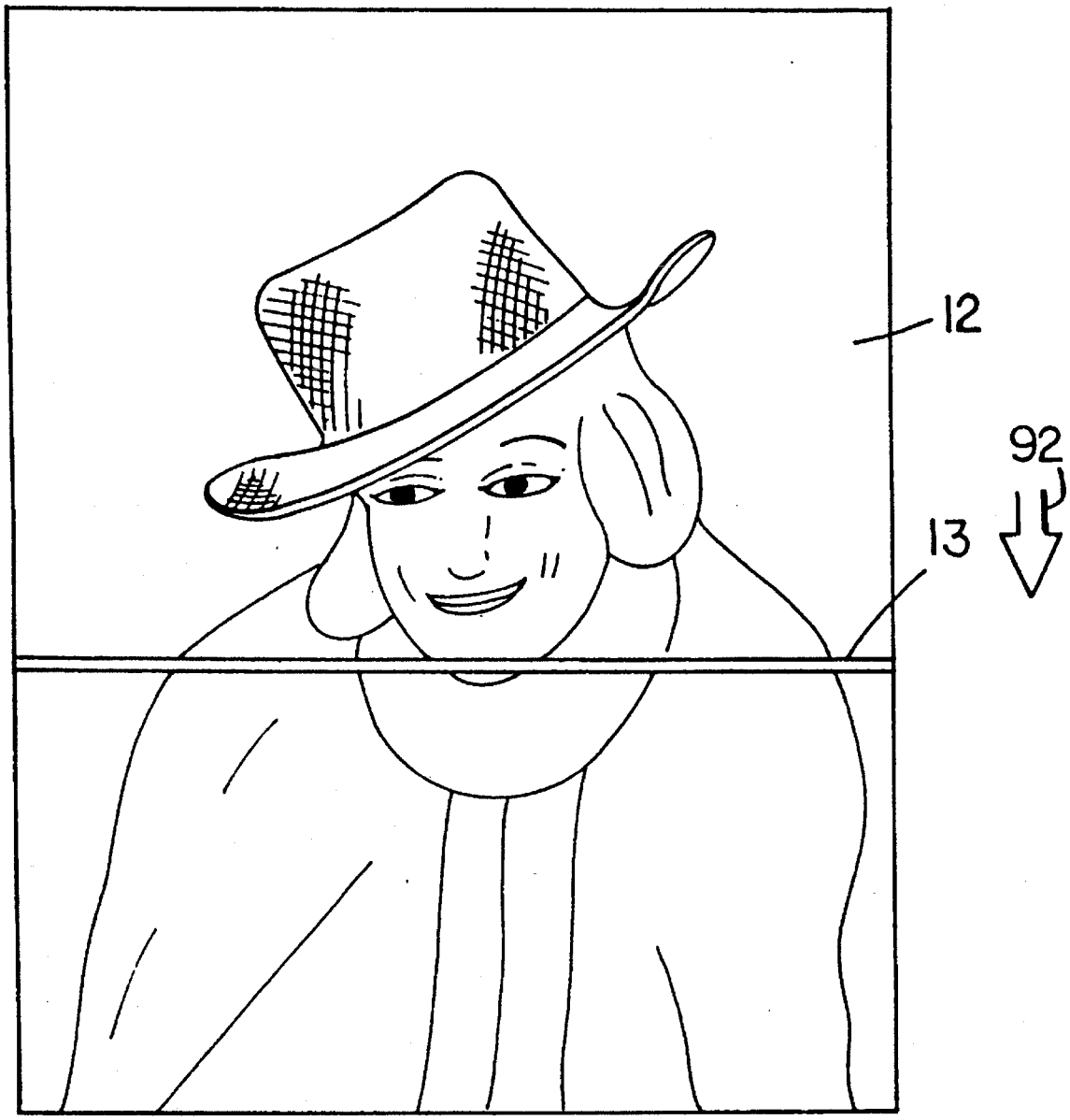
FIG. 4 is a plan view of a document which is being scanned by an optical scanner device which illustrates the movement of an illuminated scan line across the document.

The improved Y-scaling for color scanners according to the present invention is shown in FIGS. 1–3 as it could be used on a color optical scanner 10 of the type well-known in the art. Essentially, color optical scanner 10 is adapted to produce machine readable data representative of a color image of an object 12, such as a sheet of paper with graphics provided thereon as illustrated in FIG. 4. The top panel 15 of optical scanner 10 may include a transparent platen 14 for supporting the object 12 (not shown in FIG. 1) to be scanned. Top panel 15 may also include a resolution selector switch 60 and a resolution display 62 for displaying the selected scan resolution.

Referring now to FIG. 2, the optical scanner 10 may also include a displacement assembly 40 adapted to move a carriage assembly 46 back and forth underneath the platen 14 to accomplish scanning of the object 12. The carriage assembly 46 may comprise a housing 47 adapted to receive light source 16 an optional slit aperture assembly 49, as well as the various components of the optical system 18, including first, second, and third mirrors 50, 52, and 54, and a lens assembly 19, as best seen in FIG. 3.

Figure 5:
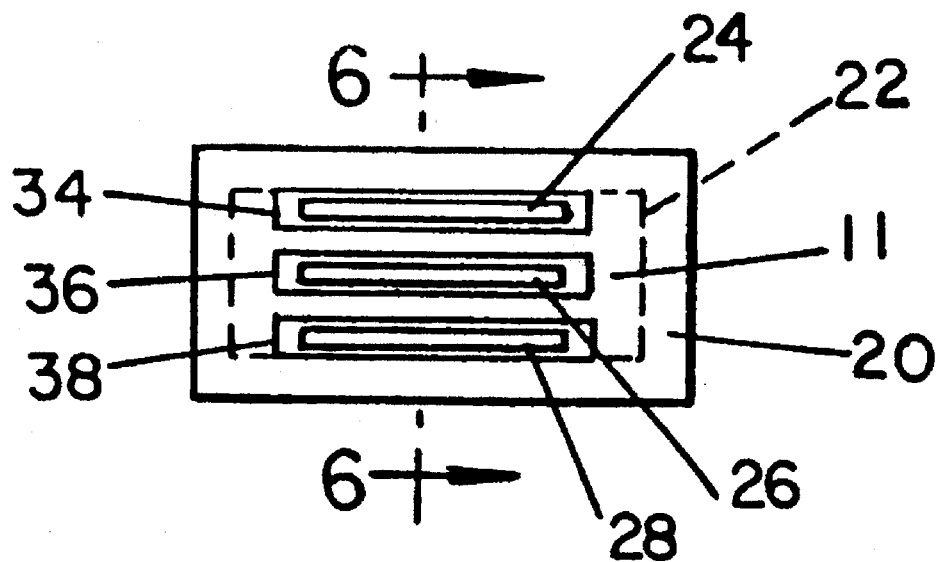
FIG. 5 is a plan view of a photosensor assembly employed in the optical scanner device of Figures. 1–3.
Figure 6:
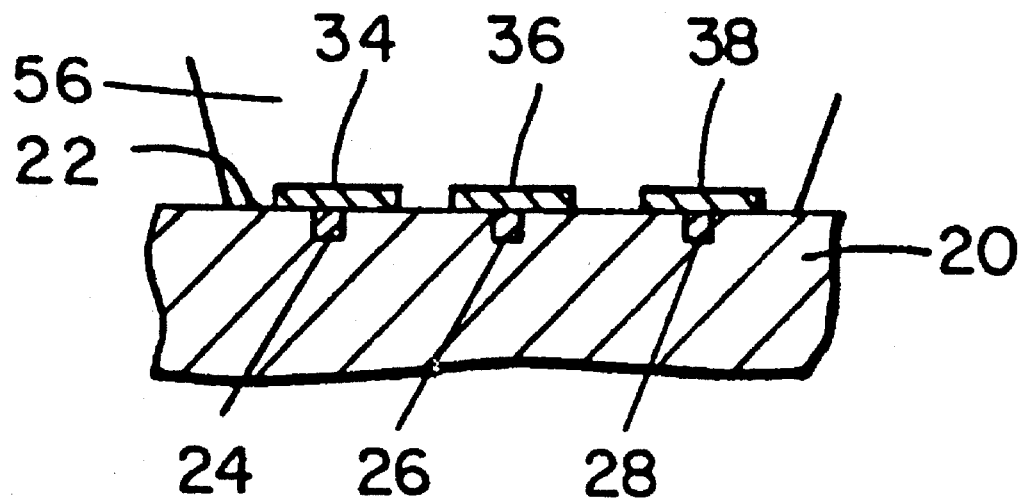
FIG. 6 is a cross-sectional elevation view of the photosensor assembly of FIG. 5.

The photosensor assembly 20 of scanner 10 is best seen in FIGS. 5 and 6 and comprises first, second, and third linear photosensor arrays or stripes 24, 26, and 28 positioned in an image region 22. As will be described in greater detail below, each linear photosensor array 24, 26, and 28 may be sampled independently of the others, which allows the control system 70 (FIG. 7) to correlate the color image data from the three arrays 24, 26, and 28, regardless of the resolution (i.e., scan rate) selected by the operator. Photosensor array 20 also includes first, second, and third color filters 34, 36, and 38 that are placed over the respective first, second, and third linear photosensor arrays 24, 26, and 28, so that the first linear photosensor array 24 receives only light of a first preselected color, e.g., red, the second linear photosensor array 26 receives only light of a second preselected color, e.g., green, and the third linear photosensor array 28 receives only light of a third preselected color, e.g., blue.

Figure 7:
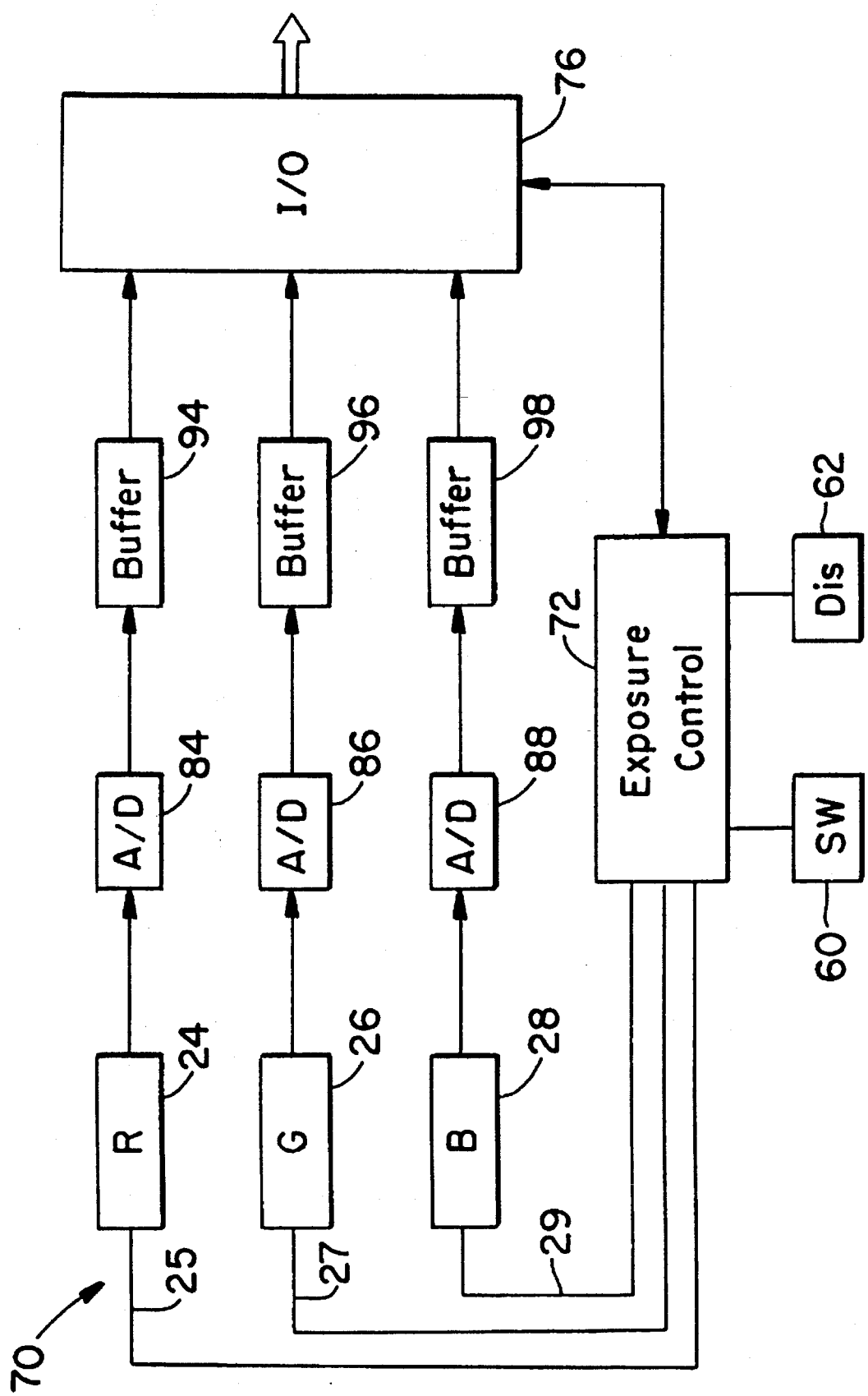
FIG. 7 is a block diagram of the control system for controlling the charge transfer switches of the individual linear photosensor arrays.

The control system 70 is best seen in FIG. 7 and may comprise respective first, second, and third analog to digital (A/D) converters 84, 86, and 88, as well as respective digital buffers 94, 96, and 98, each of which may be connected to a suitable input/output device 76. An exposure control device 72, such as a microprocessor, is connected to each of the buffers 94, 96, and 98, as well as to the input/output device 76, and operates to correlate color image data in the manner well-known in the art for scanning at native resolutions. However, unlike the prior art control systems, exposure control device 72 is also separately connected to the individual charge transfer switches (not shown) of each individual linear photosensor array 24, 26, and 28. In one preferred embodiment, the first linear photosensor array 24 is deemed the "master" array or stripe, while the remaining linear photosensor arrays, e.g., 26 and 28, are deemed "slave" arrays or stripes. Exposure control device 72 is also connected to the scan resolution switch 60 and associated display 62.

During operation, the exposure control device 72 first determines the desired scan resolution selected by scan switch 60, then determines a corresponding scan speed. The sampling rate remains constant. The exposure control device 72 next determines an exposure delay time for each of the slave arrays or stripes 26, 28. Once the exposure delay times have been calculated for the slave stripes, the exposure control device 72 initiates scanning by triggering the charge transfer switches for the first or "master" photosensor array or stripe 24, but delays the triggering of the charge transfer switches for the slave arrays or stripes by an amount of time equal to the exposure delay times that were previously calculated for each of the respective slave stripes. Each of the photosensor arrays are then cycled at the same sampling rate throughout the remainder of the scan. The present invention thus eliminates the color shift problem by selectively delaying the exposure of each of the slave linear photosensor arrays with respect to the exposure of the master linear photosensor array.

A significant advantage of the present invention is that the individual control of the exposure times for each linear photosensor array 24, 26, and 28 allows the document to be scanned at any desired resolution, i.e., scan rate. The delayed exposure time of the slave photosensor arrays allows the color image data to be correlated without encountering any subsequent color mis-alignment. Consequently, the present invention allows the simple, and well-known, data processing correlation techniques to be used, such as those disclosed in Boyd et al., in U.S. Pat. No. 5,336,878.

Another advantage of the present invention is that it is not limited to a photosensor array having three stripes, and could be easily adapted to be used with a photosensor array having any number of stripes, as would be obvious to persons having ordinary skill in the art after having become familiar with the teachings of the present invention. Still another advantage of the invention is that it is not limited to photosensor arrays having linear stripes separated by uniform spacings, and could be used just as easily with photosensor arrays having stripes separated by non-uniform spacings and regardless of whether the spacings are integer multiples of the scan line width.

The details of one embodiment of an optical scanner 10 that utilizes the improved Y-scaling according to the present invention are best seen by referring to FIGS. 1–3 simultaneously, with occasional reference to FIGS. 5 and 6. The optical scanner 10 may include a top panel 15 adapted to receive a transparent platen 14 for supporting the object 12 (FIG. 4) being scanned. Top panel 15 may also include a scan resolution selection switch 60 and associated display 62. In one preferred embodiment, the scan resolution selector 60 may be a conventional pushbutton selector, and the associated scan resolution display 62 may be a conventional LCD display. Alternatively, the scan resolution selector switch 60 and display 62 may be provided through the use of appropriate software installed on an operably connected personal computer (not shown). In the embodiment shown in FIG. 1, the scan resolution selector 60 provides a signal indicative of the selected scan resolution to the control system 70 (FIG. 7).

Referring now to FIGS. 2 and 3, the optical scanner 10 may include a displacement assembly 40, comprising a drive motor 42 and a drive belt 44, for moving the carriage assembly 46 back and forth underneath the platen 14 to accomplish scanning of the object 12. See FIG. 3. Carriage assembly 46 may comprise a housing 47 adapted to receive light source assembly 16 and a slit aperture assembly 49, although a slit aperture assembly is not specifically required by this particular embodiment. Carriage assembly 46 also includes the various components of the optical system 18.

The light source assembly 16 may comprise a pair of fluorescent lamps mounted to the slit aperture assembly 49, on either side of the scan line defining aperture 48. The optical system 18 may comprise a plurality of mirrors 50, 52, and 54 mounted within the housing 47 so as to define a folded light path 56 extending from the illuminated scan line 13 (FIG. 4) of the object 12, through aperture 48 and lens assembly 19 and onto the photosensor assembly 20 (FIG. 5) mounted within shroud assembly 58.

The carriage assembly 46 is displaced relative to transparent platen 14 and the object 12 supported thereon, in a manner well-known in the art to produce a sweeping scan image of the object 12 at the image region 22 on photosensor array 20 (FIG. 5). The structure of the optical scanner 10, as heretofore described, may be similar or identical to the optical scanner described in U.S. Pat. No. 4,926,041 of Boyd et al. which is incorporated by reference above.

Figure 8:
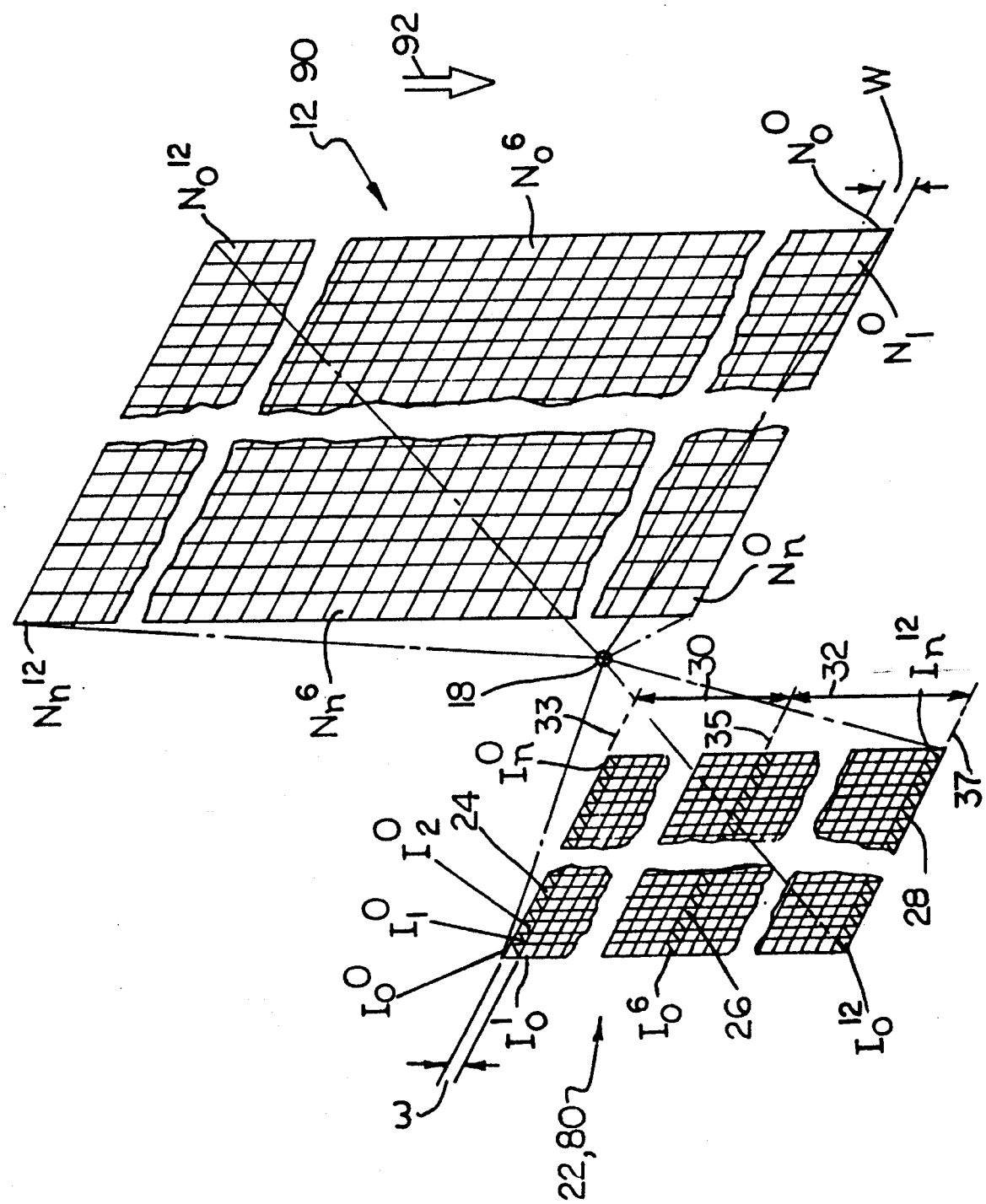
FIG. 8 is a schematic illustration of the image region associated with a three line photosensor assembly and a corresponding portion of a scanned object, each divided into a pixel-sized grid.

Referring now to FIGS. 5 and 6, the photosensor assembly 20 may comprise a CCD photosensor having two, three, four, or more stripes to accomplish color imaging. The stripes may be separated by uniform spacings, although the present invention could also be used with a photosensor assembly having a plurality of stripes positioned at nonuniform spacings. Since most color optical scanners utilize three photosensors to detect light in three colors, typically red, green, and blue, the particular embodiment shown and described herein may comprise a CCD photosensor having three stripes. In such an embodiment, the CCD photosensor may comprise first, second, and third stripes (i.e., linear photosensor arrays) 24, 26, and 28, all located within an image region 22, which corresponds to the illuminated scan line 13 (FIG. 4). As best seen in FIGS. 5 and 8, each stripe e.g., 24, 26, 28 is positioned in parallel spaced-apart relation and comprises a plurality of cells or pixels arranged along a line or stripe. The centerline 35 of the second stripe or linear photosensor array 26 is separated from the centerline 33 of the first stripe 24 by a first distance 30, while the centerline 37 of the third stripe 28 is separated from the centerline 35 of the second stripe 26 by a second distance 32. In one embodiment, each pixel may have a scan line width w (Figure of about 8 microns, and the first and second distances 0 and 32 may be about six (6) scan line widths w.

The charge transfer switches (not shown) of each linear photosensor array 24, 26, and 28 may be independently triggered by exposure control device 72 via respective charge transfer switch lines 25, 27, and 29, as best seen in FIG. 7. The ability to independently trigger the charge transfer switches (not shown) of each linear photosensor array 24, 26, and 28, allows the present invention to provide a color image data stream when scanning at non-native resolutions that emulates the color image data stream produced by a non-independently controlled photosensor array scanning at a native scan resolution. A photosensor array having independent charge transfer lines for each of the three (3) linear photosensor stripes is available from Toshiba as model number TCD2250C.

First, second, and third color filters 34, 36, 38 are operably associated with the first, second, and third stripes or linear photosensor arrays 24, 26, 28, respectively. Each filter may be of a different color so that the first linear photosensor 24 receives only light of a first preselected color, e.g., red, the second linear photosensor 26 receives only light of a second preselected color, e.g., green, and the third linear photosensor 28 receives only light of a third preselected color, e.g., blue. Except for the fact the photosensor assembly 20 must include independently controlled charge transfer switches for each of the linear arrays or stripes, the photosensor assembly 20 and associated filters 34, 36, 38 may be of the type disclosed in U.S. patent application, Ser. No. 869,273 of Michael John Steinle and Steven Lawrence Webb, entitled COLOR IMAGE SENSING ASSEMBLY WITH MULTIPLE LINEAR SENSORS AND ALIGNED FILTERS filed Apr. 15, 1992, which is hereby specifically incorporated by reference for all that it discloses.

The relationship between the illuminated scan line 13 on the object 12 and image region 22 is best understood by referring to FIG. 8. For purposes of illustration, image region 22 may be represented as a grid of image pixels "I" designated $I^0_0$–$I^{12}_n$ with image pixel rows indicated by superscript and image pixel columns indicated by subscript. Thus, a linear photosensor array 24 having n separate pixels comprises image pixels $I^0_0$ to $I^0_n$ and is one scan line width "w" wide. The scan line in image region 22 adjacent the above described scan line is the scan line represented by pixels $I^1_0$ to $I^1_n$. Since the centerline 35 of the second linear photosensor array 26 is separated from the centerline 33 of the first linear photosensor array 24 by a first distance 30 of six (6) scan line widths w, the second photosensor array 26 contains pixels $I^6_0$ to $I^6_n$. Similarly, the third linear photosensor array 28 contains pixels $I^{12}_0$ to $I^{12}_n$, since it is separated from the second photosensor array 26 by the second distance 32 of six (6) scan line widths w.

The illuminated scan line 13 that corresponds to image region 22 is divided into a corresponding grid of native pixels "N" and designated with superscripts and subscripts. The superscript and subscript indicated for each native pixel "N" corresponds to the superscript and subscript of the associated image pixels "I" in image region 22, i.e., $N^0_0$ corresponds to $I^0_0$, $N^{12}_n$ corresponds to $I^{12}_n$, etc. The direction in which the scanned object 12 is moved with respect to the optical assembly 18 is indicated by arrow 92. Thus, a scanner displacement of one native scan line width W represented by pixels $N^{12}_0$ through $N^{12}_n$, would move the native scan line on the object 12 down one native scan line width W to the position occupied by $N^{11}_0$ through $N^{11}_n$ with a corresponding displacement of image pixels "I" in the image region 22.

As best seen in FIG. 8, at any particular point in time during a scanning operation the native scan line that is projected onto the first linear photosensor array 24 is not the same as the native scan line that is projected onto the second linear photosensor array 26. Likewise, the native scan line that is projected onto the third linear photosensor array 28 is not the same as the native scan lines that are projected onto the first and second arrays 24 and 26. For example, the native scan line that is projected onto the first linear photosensor array 24 is $N^0_0$ through $N^0_n$, while the native scan line that is projected onto the second photosensor array 26 is $N^6_0$ to $N^6_n$. The native scan line that is projected onto the third linear photosensor array 28 is $N^{12}_0$ to $N^{12}_n$. These three native scan lines $N^0_0$–$N^0_n$, $N^6_0$–$N^6_n$ and $N^{12}_0$–$N^{12}_n$ are separated from one another on the object 12 by distances which correspond to the first and second gap distances 30, 32, but multiplied by the lens reduction ratio. Put in other words, the width W of each native scan line is equal to the width w of the image scan line multiplied by the lens reduction ratio.

With further reference to FIG. 8, it will be appreciated that if scanner displacement in direction 92 takes place at a rate of 1 native scan line width W per photosensor sampling interval, the light which is projected onto each linear photosensor array during a sampling interval will, in general, represent information from one native scan line on the object 12. It will also be appreciated that if the scan speed is increased while the sampling interval remains constant, light from more than one native scan line will be imaged on each photosensor array during a single sampling interval. For example, at a scan speed corresponding to three (3) native scan lines per photosensor sampling interval, the light from three (3) adjacent native scan lines will be impinged on a single linear photosensor during a single sampling interval. As a result, the output of the linear photosensor at the end of the sampling interval will be representative of an average of the three adjacent native scan lines.

It is useful for conceptual purposes to consider the number of native scan lines which are traversed during a sampling interval to represent a single "effective" native scan line. Thus, for example, at a scanning speed three (3) times faster than a rate of one native scan line per sampling interval, the effective native scan line width is equal to three (3) regular native scan line widths because the sensor "sees" three (3) native scan lines during each sampling interval.

Figure 9A:
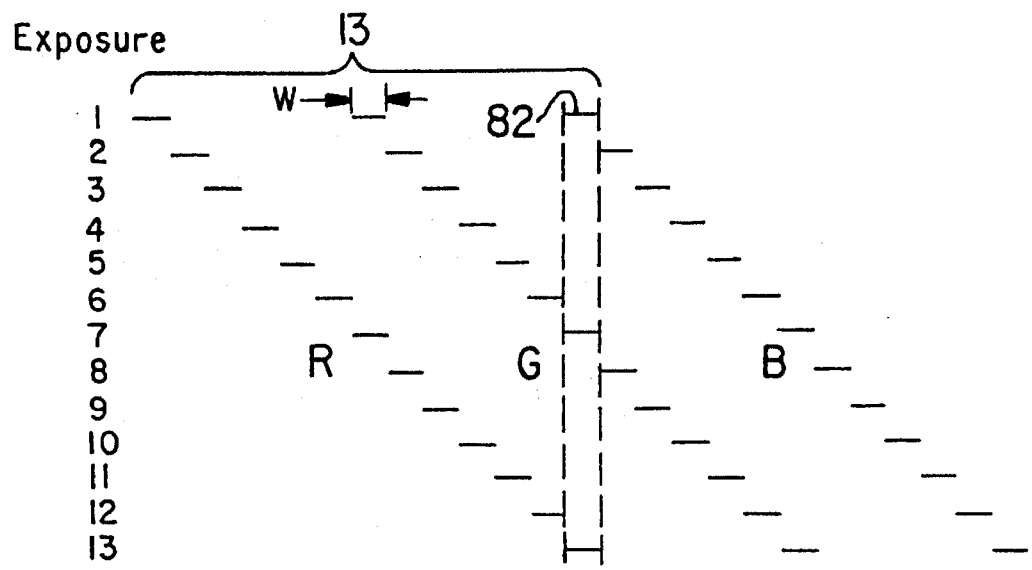
FIGS. 9(a)–(c) are schematic representations of exposure positions and times for a three strip photosensor scanning at native resolution in FIG. 9(a) and scanning at ¼native resolution in FIGS. 9(b) and (c).

The color shift problem associated with the configuration shown in FIG. 8 is best understood by referring to FIGS. 9(a) and (b). Consider, for example, a scanner having a photosensor array 20 as described above comprising three stripes (e.g., 24, 26, and 28), each stripe being one (1) scan line width wide and separated from each other by six (6) scan line widths (center-to-center distance). When scanning at native resolution of one native scan line width W per sampling interval, the respective R, G, and B exposures for each of the CCD stripes are offset by a distance corresponding to the spacing between the stripes, i.e., six (6) native scan line widths. Consequently, at exposure number 1, the red stripe R, green stripe G, and blue stripe B are each exposed to one native scan line having a width W. Since the illuminated scan line 13 comprises thirteen (13) scan line widths W, each stripe of the photosensor array 20 is only exposed to one-thirteenth (1/13) of the illuminated scan line 13. Therefore, when scanning at the native scan resolution specified above, thirteen (13) separate exposures are required to collect color image data from the entire illuminated scan line 13, with each linear photosensor array or stripe being exposed to the next contiguous native scan line during each successive sampling interval.

Color data correlation is relatively easy when scanning at the native scan resolution specified above, since the native scan line exposed to the blue photosensor on the $N^{th}$ exposure corresponds to the same native scan line exposed to the green photosensor on exposure N+6, and to the red photosensor on exposure N+12. For example, the particular native scan line 82 that was exposed to the blue photosensor on exposure number 1 was exposed to the green photosensor on exposure number 7, and to the red photosensor on exposure number 13. See FIG. 9(a).

Figure 9B:
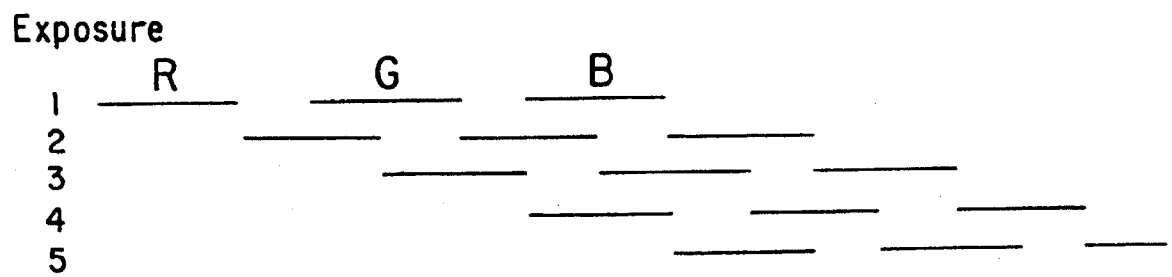

Problems develop, however, when scanning at resolutions other than the native resolutions. For example, FIG. 9(b) shows the exposure pattern when scanning at 1/4 native resolution (i.e, 4 native line widths W per sampling interval). As can be seen, the effective native pixels exposed to the R, G, and B photosensors do not correspond for any exposure number. Before this invention, the "color shift" that is created when scanning at non-native resolutions could sometimes be removed by resorting to relatively complex data processing techniques.

Figure 9C:
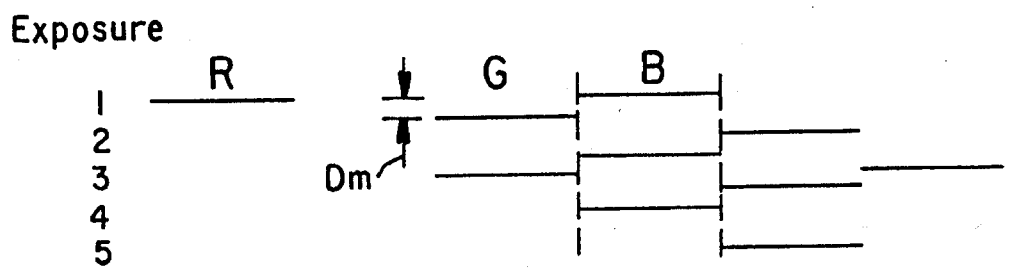

The present invention eliminates the color shift problem at all resolutions by selectively delaying the exposure of each of the slave linear photosensor arrays with respect to the exposure of the master linear photosensor array. For example, the red linear photosensor array 24 may be designated the master array, while the green and blue arrays 26 and 28 will be designated slave photosensor arrays. By determining the appropriate exposure delay times for the slave photosensor arrays, the native scan lines exposed to the various arrays can again be correlated as if the scanning were being carried out at a native scan resolution. For example, the color shift problem shown in FIG. 9(b) can be eliminated as shown in FIG. 9(c) by delaying the first exposure of the green linear photosensor array 26 by one-half the sampling rate (i.e., the time between two successive exposures), but not delaying the first exposure of the blue linear photosensor array 28. The appropriate delay time $D_m$ for each slave array is calculated by the exposure control device 72 which then triggers the charge transfer switches of the various stripes 24, 26, and 28 of the CCD array 20 at the appropriate times. The aligned color image data may then be correlated by means well-known in the art for correlating color image data when scanning at native scan resolutions.

For a photosensor array 20 having M linear arrays or stripes, the delay time $D_m$ for a given stripe m is given by the following equation:

$$D_m = \left(i - \frac{N_m}{K}\right) t_e$$

where:
$N_m$=the number of native line spacings between the centerline of the master stripe and the centerline of the mth slave stripe;
K=the ratio of the native resolution to the desired resolution (e.g., K=4 when scanning at 1/4 native resolution);
$t_e$=the exposure time, a constant;
i=is the next largest integer value of the ratio ($N_m/K$).

By way of example, assume a photosensor array having linear photosensor arrays (i.e., M=3), numbered 0, 1, and 2, and separated from each other by six (6) native line spacings. The zeroth (e.g. the first array 24) array may be deemed the master array, while the first and second arrays (e.g., the second and third arrays 26 and 28) are deemed slave arrays. Further, assume that the scanning is to occur at 1/4 native resolution.

The first step in the process is to calculate the desired scan speed at the desired resolution, as is well-known known in the art. For example, the scan speed S in inches per second may be given by:

$$S = \frac{1}{Rt_e}$$

where:
R= the desired scanning resolution in lines per inch; and
$t_e$=the exposure time in seconds (a constant).

The delay time $D_1$ for the second or green photosensor array is next calculated by first determining an appropriate integer value for i. For the first slave array, m=1, so i=[6/4], or 1.5. Increasing this amount to the next highest integer value yields an i equal to 2. Thus, the delay time $D_1$ for the first slave array is (2−1.5) $t_e$ or 0.5$t_e$. Similarly, the value of the integer i for the second slave array 3 i.e., [12/4], which yields a delay time $D_2$ of 0$t_e$.

Therefore, for the example given above, the first exposure for the green array is delayed by one-half the exposure time $t_e$, while the exposure times for the red and blue arrays are not delayed at all. These delay times correspond to the situation illustrated in FIG. 9(c).

The above-described method can be used on a photosensor assembly 20 having any number M of stripes separated by any distance, uniform or non-uniform, and may be used to scan at any resolution, regardless of whether it is a native resolution.

It is contemplated that the inventive concepts herein described may be variously otherwise embodied and it is intended that the appended claims be construed to include alternative embodiments of the invention except insofar as limited by the prior art.

What is claimed is:

1. A method of scanning an object at a predetermined resolution along a scanning direction with color scanner apparatus having M linear photosensors positioned in parallel, spaced-apart relation, each of the M linear photosensors having a width and being characterized by a single master linear photosensor and (M-1) slave linear photosensors, each of the linear photosensors being exposed for an exposure time, comprising the steps of:

calculating an exposure delay time for each of the (M-1) slave linear photosensors;

at a start scan time, exposing the master linear photosensor for the exposure time; and exposing each of the (M-1) slave linear photosensors for the exposure time, the exposure time for each of the (M-1) slave linear photosensors being delayed from the start scan time by the exposure delay time calculated for each of the respective (M-1) slave linear photosensors.

2. The method of claim 1, further including the step of correlating image data from each of the M linear photosensors so that the image data from each of the M linear photosensors corresponds to substantially the same position on the object.

3. The method of claim 2, wherein the exposure delay time for each of the (M-1) slave linear photosensors of the photosensor assembly is determined according to the following relation:

$$D_m = \left( i - \frac{N_m}{K} \right) t_e$$

where:

$N_m$=the number of native line spacings between the master linear photosensor and an mth slave linear photosensor;

K=the ratio of a native resolution to the predetermined resolution;

$t_e$=the exposure time;

i= is a next largest integer value of a ratio ($N_m$/K).

4. The method of claim 3 including the step of calculating a scan speed corresponding to the predetermined resolution before the step of calculating an exposure delay time for each of the (M-1) slave linear photosensors.

5. Apparatus for scanning an object at a predetermined resolution along a scanning direction, comprising:

light source means for illuminating the object;

imaging means for focusing light from an illuminated scan line on the object onto an image region and for providing an image of the illuminated scan line on the object at the image region;

a photosensor assembly operable in successive sampling intervals for generating image data representative of a color image of the object comprising:

first linear photosensor means located in said image region for generating a first data signal representative of the intensity of light impinged thereon; and second linear photosensor means located in said image region for generating a second data signal representative of the intensity of light impinged thereon, said second linear photosensor means being positioned parallel to said first linear photosensor means and spaced therefrom by a first photosensor gap distance;

first and second color filter means operatively associated with said first and second linear photosensor means, respectively, for filtering light focused on said first and second linear photosensor means, wherein said first linear photosensor means receives only light of a first preselected color and said second photosensor means receives only light of a second preselected color;

displacement means for producing relative displacement between the object and said imaging means and for producing a sweeping scan image of the object in the image region; and exposure control means connected to said first linear photosensor means and to said second linear photosensor means for delaying by a predetermined amount of time the exposure of said second linear photosensor means to light from the illuminated scan line relative to the exposure of said first linear photosensor means to light from the illuminated scan line.

6. The apparatus of claim 5, further comprising data correlation means for correlating image data from the photosensor assembly, so that image data from said first and second linear photosensor means correspond to substantially the same position on the illuminated scan line.

7. The apparatus of claim 6 further comprising scan resolution selection means connected to said exposure control means for selecting a predetermined one of different resolutions and for generating a scan resolution signal indicating the predetermined scan resolution.

8. The apparatus of claim 7, wherein said exposure control means includes:

means for calculating a scan speed corresponding to the predetermined resolution;

means for calculating an exposure delay time for said second linear photosensor means;

means for exposing said first linear photosensor means for an exposure time at a start scan time; and means for exposing said second linear photosensor means for the exposure time, the exposure time for said second linear photosensor means being delayed from the start scan time by the exposure delay time.

9. The apparatus of claim 8, wherein said first and second linear photosensor means comprise respective first and second linear CCD arrays.

10. The apparatus of claim 5, further comprising:

third linear photosensor means positioned in said image region for generating a third data signal representative of the intensity of light impinged thereon, said third linear photosensor means being positioned in parallel, spaced-apart relation to said first and second linear photosensor means and spaced apart from said second linear photosensor means by a second photosensor gap distance;

third color filter means operatively associated with said third linear photosensor means for filtering light focused on said third linear photosensor means, wherein said third linear photosensor means receives only light of a third preselected color;

and wherein said exposure control means is also connected to said third linear photosensor means so that it can delay for a predetermined amount of time the exposure of said second linear photosensor means to light from the illuminated scan line relative to the exposure of said first linear photosensor means to light from the illuminated scan line and the exposure of said third linear photosensor means to light from the illuminated scan line relative to the exposures of said first and second linear photosensor means.

* * * * *